United States Patent

[11] 3,630,578

| [72] | Inventor | Willard D. Kaiser |
| | | Grove City, Ohio |
| [21] | Appl. No. | 835,517 |
| [22] | Filed | June 23, 1969 |
| [45] | Patented | Dec. 28, 1971 |
| [73] | Assignee | Goodyear Tire & Rubber Company |
| | | Akron, Ohio |

[54] VIBRATION SUPPRESSOR FOR BRAKED WHEELS
7 Claims, 10 Drawing Figs.

[52] U.S. Cl. .................................................. 303/21 A,
303/1
[51] Int. Cl. .................................................. B60t 8/12
[50] Field of Search ....................................... 303/1, 21
A, 21 B, 21 BE; 188/1, 1 B, 181

[56] References Cited
UNITED STATES PATENTS
| 3,237,996 | 3/1966 | Lucien .................. | 303/21 BE |
| 3,362,757 | 1/1968 | Marcheron ............ | 303/21 A4 |

*Primary Examiner*—Duane A. Reger
*Attorneys*—F. W. Brunner, P. E. Milliken and Oldham & Oldham

ABSTRACT: The invention modulates the braking force as a function of the motion or vibration of the carrying axle or supporting structure for a braked wheel or wheels. Any suitable means to sense the motion is utilized with the output of this means actually modulating the brake pressure to the brake system to provide for the vibration suppression.

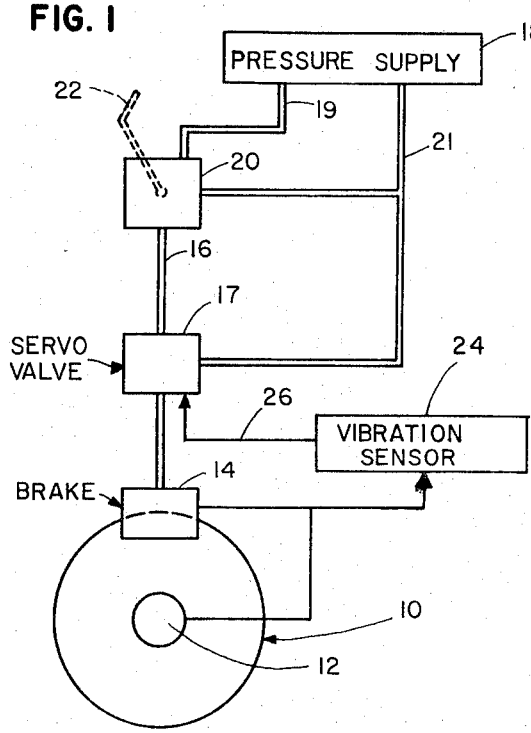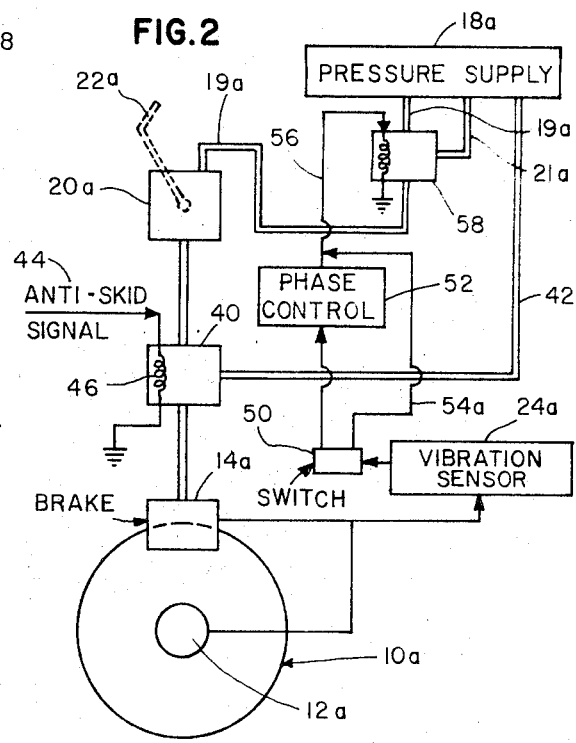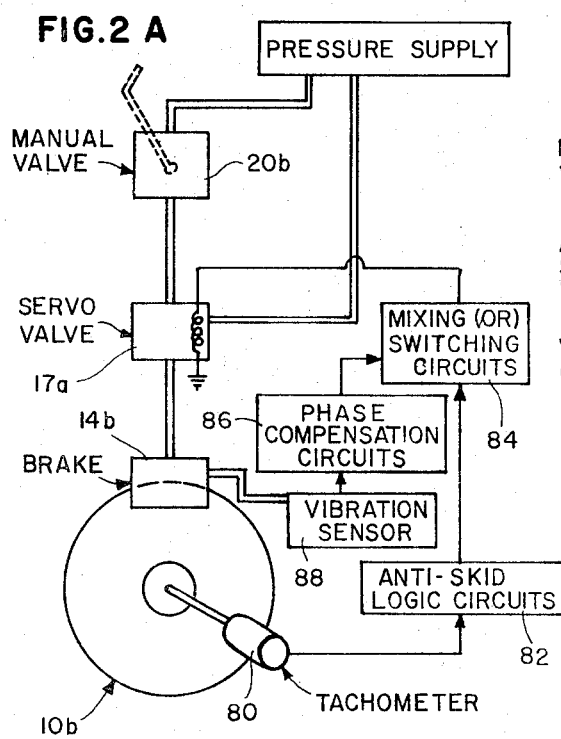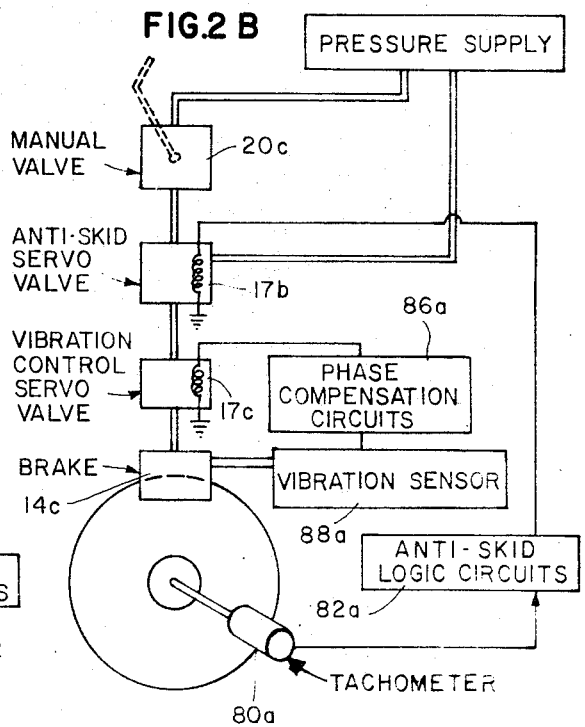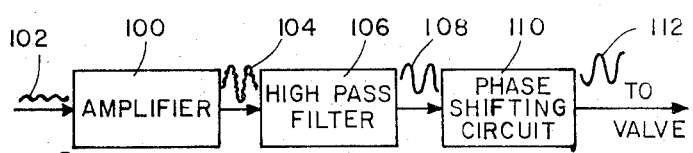

INVENTOR.
WILLARD D. KAISER
BY
Oldham & Oldham
ATTORNEYS

VIBRATION SUPPRESSOR FOR BRAKED WHEELS

VIBRATION SUPPRESSOR FOR BRAKED WHEELS NATURE OF THE PROBLEM

One of the problems which is quite common in aircraft is strut assembly vibration during application of the brakes. Many attempts have been made to overcome this problem including substitution of brake materials, and utilization of dynamic dampers such as springs and masses or shock absorbers of various types. Usually, however, the substitutions are made at the cost of increased weight, increased cost, reduced brake effectiveness, substitution of brake materials, resistance to heat, or other desirable braking properties.

Vibration or chatter in large wheel brakes, such as those for large aircraft, normally occurs at the lowest natural frequency of the wheel mounting structure. The cause of the vibration is the difference between the static dynamic coefficient of friction of the friction surfaces. The invention contemplates the elimination of this form of low frequency (usually below 50 cycles per second) instability by modulation of the braking forces as a function of the motion or vibration of the overall structure or system.

Therefore, the general object of the invention is to provide a modulation system for brake pressure in a braked wheel assembly that will serve to provide vibration control in a positive manner and quite economically.

The aforesaid object of the invention, and other objects which will become apparent as the description proceeds are achieved by providing a vibration suppression system for a braked wheel which comprises an axle, a wheel rotatably mounted to the axle, a brake for the wheel, pressure supply means to supply pressure to the brake, and means to control the pressure supply to the brake which is characterized by a vibration sensor associated with the wheel and axle to determine vibration and produce signals thereof; and means to control the hydraulic pressure supply to the brake in accordance with the signals from the vibration sensor.

For better understanding of the invention reference should be had to the accompanying drawings wherein:

FIG. 1 is a block diagrammatic illustration of the basic control features of the vibration damping system of the invention;

FIG. 2 is a block diagram schematic of an enlarged modulation system utilized with an aircraft brake that is also provided with antiskid brake pressure modulation control; and FIGS. 2A and 2B are block diagrams of modified systems to accomplish the objects of the invention;

FIG. 8 is a block diagram of the electrical components comprising the phase control circuit.

Figure 3:
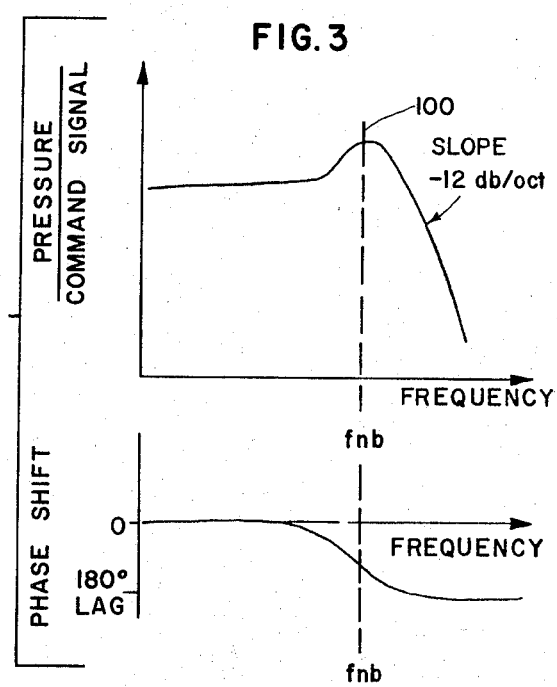
FIGS. 3 to 7 are graphic illustrations of the functions associated with the apparatus of the invention showing the desired characteristics.

In order to provide the modulation of brake pressure to generate forces which act as damping forces on the strut, it is necessary to (a) generate signal proportional to strut velocity, (b) perhaps compensate the signal to correct for slow response time in the servo valve and brake system depending upon response time of such system, and (c) convert the signal into force by feeding it into the control valve for the system.

The basic form of the invention is shown in FIG. 1 of the drawings, and incorporate these features listed above. Specifically, the numeral 10 indicates generally a wheel mounted rotatably to an axle 12, and which wheel 10 is braked by a suitable brake system indicated schematically by block 14. Hydraulic pressure is provided to brake 14 over line 16, with the control of the pressure from a hydraulic pressure supply 18 being provided by a suitable valve 20. The control through valve 20 is normally achieved manually by a suitable foot pedal control indicated by dotted line 22. The hydraulic fluid from pressure supply 18 passes to valve 20 over line 19. A return line 21 is provided from valve 20 for dumping excessive pressure, and this is the way in which most of these pressure proportional valves 20 function with the manual control by foot pedal 22.

The essence of the system is provided by a vibration sensor indicated generally by block 24 which sends a control signal over line 26 to valve 20 via a servo valve 17. The invention contemplates that the signal over line 26 from sensor 24 will normally be an electrical signal, and will be coordinated with the delay characteristics and response times of valve 20 so as to substantially relieve pressure on the brake 14 at the proper time when vibration is sensed by unit 24. The essential component in sensor 24 is some suitable type of transducer which is utilized to generate the control signal.

For the initial purposes of demonstrating the feasibility of the invention an accelerometer was utilized because (1) it did not require a fixed measuring reference, (2) it could be installed on almost any system with minor mechanical modifications, (3) it was available with more than adequate frequency response, and (4) it worked with moderately simple compensation circuits. However, it should be understood that other types of transducers might also be quite satisfactory, For example, a force or torque transducers installed between the bake and the mounting strut would be a typical example. Also a tachometer might be utilized to measure angular wheel speed with this providing indications of vibration as angular wheel speed changed.

It should be understood that the invention is only designated to operate when vibration or chatter occur which represents a self-sustained oscillation. The purpose of the invention is to brake such self-sustained oscillation by in effect reducing or increasing brake pressure at the appropriate time to positively counteract the oscillating vibration.

COMPENSATION

The primary objective of adding compensation circuits in the control system is to correct for phase and gain errors generated by components in the system. The two functions which are required are (1) to integrate the transducer signal into a velocity signal, and (2) to eliminate the phase shift that occurs due to valve response time delay and brake complicance. This type of system is more sophisticated and is shown in FIGS. 2 of the drawings. Those components which are similar to those of FIG. 1 are labeled with the same numbers with the suffix *a* added. Essentially, the added components in the modification of FIG. 2 include an antiskid valve 40 which is positioned in line 16a and has a return line 42 to the pressure supply 18a. The antiskid valve 40 is actuated by an antiskid signal 44 operating in the conventional manner through an appropriate solenoid coil 46 within valve 40, all as well understood by those skilled in the art.

For control purposes, it may be desirable to have the vibration sensor 24a feed into a switch 50 which can selectively send a signal to a phase control 52 over line 54 or directly via line 54a to line 56. In either event, the signal over line 56 is sent to a vibration control valve 58, which placed on line 19a, and incorporates return line 21a. It should be understood however, that using the phase control 52 is not an option of the pilot. Its need is determined by the components used. When components are used which require compensation, it is required all the time.

The phase control circuit 52 is important in this more sophisticated embodiment of the invention, and incorporates lead-lag networks, which provide the phase shifting necessary to the signal from sensor 24a so that phase is proper in the relief or addition of pressure through valve 58 to the brake system. The proper phasing for the modulation of brake pressure (in reducing vibration) is that time phasing which will produce torque in direct opposition to the variable torque which is generating the vibration. A typical circuit for control 52 is shown in FIG. 8 and a description for such compensation circuit is as follows:

The signal from the vibration sensor 24a is first received by a typical amplifier 100 which integrates and increases the strength of the somewhat sinusoidal signal 102 received as an input so the signal looks like wave 104. The wave 104 is then processed by high-pass filter 106 that serves to block out any steady state DC component thereof to produce wave 108. The wave 108 passes into a phase shifting circuit 110 which includes conventional phase shifting components that have been preselected to shift the phase of wave 108 by between 90° to 180° depending on the specific characteristics of valve response time delay and brake compliance for the particular brake involved. These characteristics may be predetermined either mathematically or experimentally. In any event, assuming in this instance that the phase shift is 135°, the wave out of circuit 110 is indicated by numeral 112, and has been phase shifted 135°The wave 112 then provides e compensation to valve 58 to effect as precisely as possible a control 180°out of phase with with the harmonic vibrations in the strut or wheel caused during braking. The compensating wave 112 will be substantially duplicated in the compensation circuits 86 and 86a described below with reference to FIGS. 2A and 2B.

One of the advantages of this system is that the servo valve normally in the system as an antiskid valve can also be used for vibration control. This type of arrangement is illustrated in FIG. 2a of the drawings.

Specifically, FIG. 2a illustrates a tachometer 80 which picks off speed indication from the rotating wheel 10b, and sends these signals into an antiskid logic circuit 82 which in turn makes the signal usable in a mixing or switching circuit 84. The mixing or switching circuit 84 also receives a signal from an appropriate phase compensation circuit 86 which receives its signal from a vibration sensor 88. The brake 14b provides the vibration signals to the sensor 88, as in the other embodiments shown in FIGS. 1 and 2. The mixing or switching circuits 84 then feed the compensating signal to a servo valve 17a which is positioned between a manual valve 20b and the brake 14b. Then, the antiskid logic circuits operate to produce a signal similar to the antiskid signal 44 in FIG. 2, while the phase compensation circuits 86 produce the same type of phase control signal as generated by phase control 52 in FIG. 2. The mixing in circuits 84 of these signals to properly actuate the servo valve 17a is readily within the skill of anyone familiar with electronic techniques and the mixing of signals to provide compensating outputs.

A modified version of the scheme of FIG. 2a is illustrated in FIG. 2b. In this version, no mixing or switching is necessary, as the tachometer 80a generates an antiskid signal through circuits 82a, all in the conventional manner and simply controls a separate antiskid servo valve 17b, which is the conventional type of antiskid control defined in FIG. 2 above. However, the vibration control servo valve 17c is also included in this circuit positioned between the manual valve 20c and the brake 14c to receive phase compensation signal from circuits 86a which in turn are driven by an appropriate vibration signal from sensor 88a. Note that in the embodiment of FIG. 2b, the positioning of the vibration control servo valve 17c is between the manual valve 20c and the brake 14c which distinguishes from the positioning of the servo valve 58 in the embodiment of FIG. 2.

The transfer function for the pressure control valve 20 in FIG. 1, or in any of the corresponding valves in the other FIGS. 2 through 2b, as applied in a typical brake system is illustrated in the graph of FIG. 3. The apparent natural frequency ($f_{nb}$) as indicated by dotted line 100 is low relative to the vibration frequencies which are to be controlled, and in the typical brake system this is the case, so compensation must be used.

Figure 4:
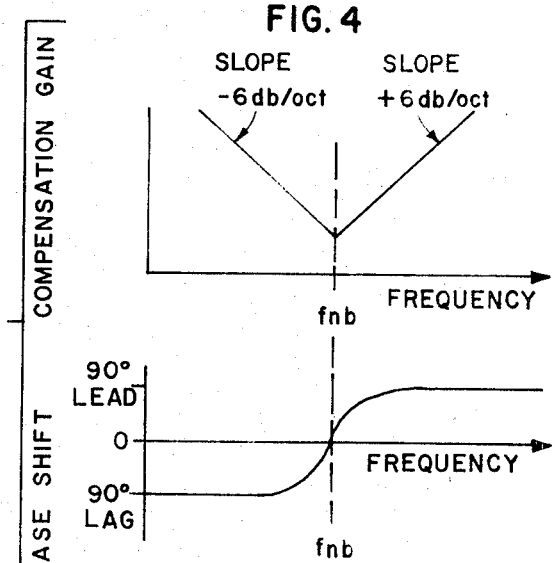

When a lag-lead-lead circuit, such as the phase control 52 or phase compensation circuits 86 and 86a, in FIGS. 2 through 2b, respectively, is added to the electrical signal driving a servo valve positioned between the manual control valve and the bake, response function characteristics are generated such as illustrated by the graphs of FIG. 4. These signals are added to the signal driving the servo valve which results in a combined transfer function for the compensation circuit and valve brake system as shown in the graph in FIG. 5.

Figure 5:
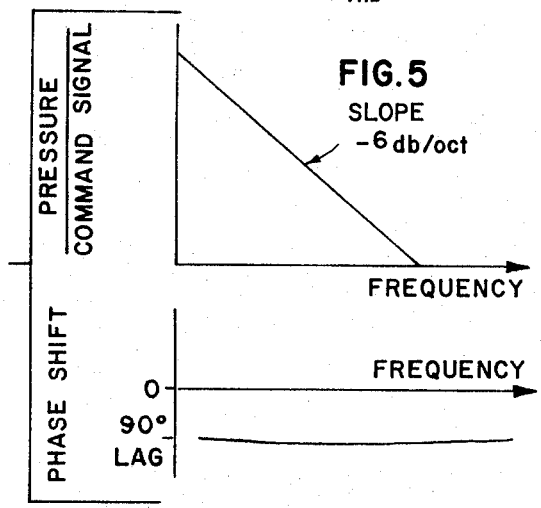
Figure 6:
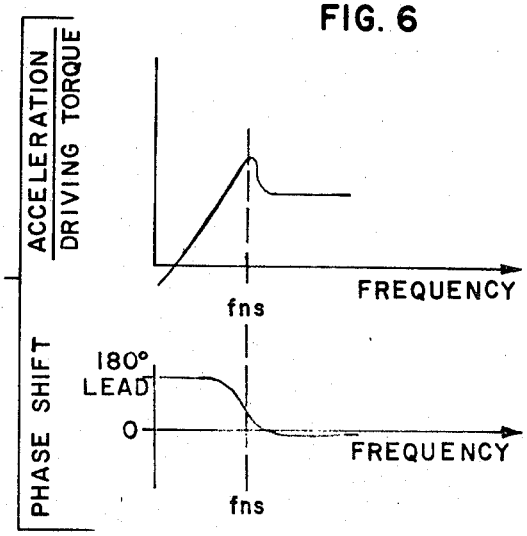
Figure 7:
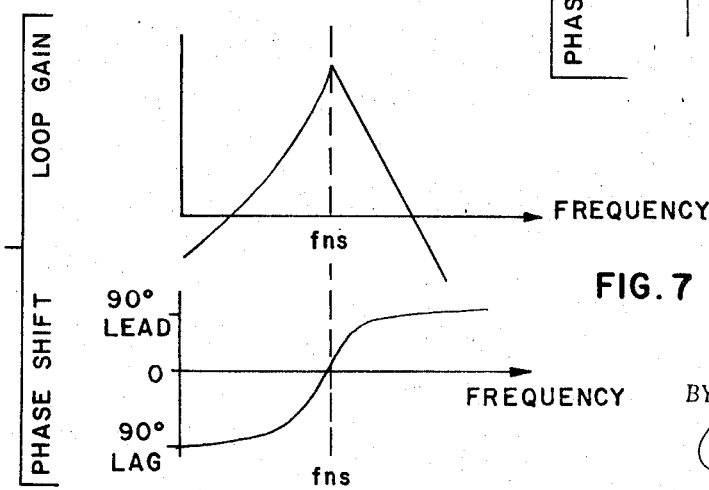

Assuming that an accelerometer is used to sense the vibration of the brake, strut, or other means mounting the rotating wheel, the transfer function at low frequencies is shown in the graph of FIG. 6, where $f_{ns}$ is the fundamental natural frequency of whatever structure the measurement is being taken on. When a properly compensated valve having the characteristics shown in FIGS. 5 is attached to the system and driven by an acceleration signal from a system having the characteristics of the type shown in FIG. 6, the system will have a complete loop transfer function as shown in the graph of FIG. 7. This is a stable system and has the advantage that stability does not depend upon the strut natural frequency ($f_{ns}$) so long as the strut natural frequency is within the range where the valve-brake system has an approximately 90° phase lag. For a real system, it is not practical to perfectly compensate for the valve-brake characteristics, and it is also expected that the valve-brake characteristics will change with wear, temperature, and operating environment However, any changes that occur must be gross enough to produce phase errors of near 90° before the 180° phase shift required for instability is approached.

Experimental analysis has shown that changes in brake stiffness of more than 2 to 1 can be tolerated in such a system. In total, the graphs of FIGS. 3 through 7 show characteristics which are based on using a signal proportional to acceleration for the control signal. By adding different means to measure other criteria for compensation, signals proportional to velocity displacement, force, or other similar parameters could be utilized.

Because there are many natural frequencies and modes of vibration in a complex aircraft system, it may also be necessary to add low-pass filters, deadband or other compensation circuits to keep the system stable and to prevent dumping excessive pressure due to high-frequency "noise."

However, what should be understood from the graphs of FIGS. 3 through 7 is that when compensation is properly provided by the phase control 52 of FIG. 2 or the phase compensation circuits 86 or 86a of FIGS. 2a and 2b, respectively, and such compensation is matched to the valve-brake characteristics, the servo valve is driven with a gain curve which has a negative 6 db. octave slope and a phase lag of 90°.

It should be understood that the general object of the invention is achieved by utilizing some type of transducing sensor to measure brake chatter or vibration which sensor signal properly timed controls or modulates brake pressure so as to oppose such oscillations or vibrations and effectively damp the unstable condition which occurs because of the natural frequency of the system.

What is claimed is:

1. A vibration suppression system for a braked wheel which comprises
   an axle,
   a wheel rotatably mounted to the axle,
   a bake for the wheel,
   pressure supply means to supply hydraulic pressure to the brake, and
   means to control the pressure supply to the brake which is characterized by
   a sensor associated with the wheel and axle to determine harmonic vibration and produce signals thereof, and
   means to control hydraulic pressure supply to the brake in accordance with the signals from the vibration sensor to substantially oppose the forces causing the vibrations.

2. A system according to claim 1 which includes means to integrate the signal from the sensor and produce a velocity signal, and means to coordinate phase shift of such signal due to valve response time lay and brake compliance.

3. A system according to claim 2 where the means to coordinate phase shift comprises a compensation circuit to compensate for time lag response of the brake pressure supply means.

4. A system according to claim 3 where the vibration sensor is an accelerometer producing a signal proportional to the harmonic vibration of the wheel and axle.

5. A system according to claim 4 which includes an antiskid system associated with the brake which also controls the hydraulic pressure thereto in accordance with skids of the wheel.

6. A system for a braked wheel which comprises
   a rotatable wheel,
   a brake for the wheel,
   means to sense vibration of the wheel and produce an electrical signal indication thereof,
   means to supply hydraulic pressure to the brake, and
   means to modulate the hydraulic pressure in accordance with the electrical signals indicating vibration to suppress such vibration.

7. A system according to claim 6 where the means to modulate includes a phase compensation circuit to compensate for inherent time delay brake actuation.

* * * * *

PO-1050
(5/69)

UNITED STATES PATENT OFFICE
CERTIFICATE OF CORRECTION

Patent No. 3,630,578     Dated December 28, 1971

Inventor(s) Willard D Kaiser

It is certified that error appears in the above-identified patent and that said Letters Patent are hereby corrected as shown below:

Column 1, line 13, after "effectiveness," add --life, or in the case of--;
line 18, after "static" insert --and--;
line 56, after "generate" insert --a--;
line 60, after "into" first occurrence, add --a--.

Column 2, line 21, "bake" should read --brake--.

Column 3, line 12, "e" should read --the--;
line 14, delete "with" second occurrence.

Column 4, line 54, "bake" should read --brake--;
line 68, "lay" should read --delay--.

Column 6, line 7, after "delay" insert --in--.

Signed and sealed this 21st day of November 1972.

(SEAL)
Attest:

EDWARD M. FLETCHER, JR.        ROBERT GOTTSCHALK
Attesting Officer              Commissioner of Patents